(12) United States Patent
Schook

(10) Patent No.: US 9,067,153 B2
(45) Date of Patent: Jun. 30, 2015

(54) DEVICE FOR SEPARATING A FLOWING MEDIUM COMPRISING MIXTURE INTO FRACTIONS, THROUGHFLOW TANK AND METHOD FOR MANUFACTURING A PLATE SEPARATOR DEVICE

(75) Inventor: Robert Schook, Steenderen (NL)

(73) Assignee: Advanced Technologies & Innovations B. V., Arnhem (NL)

( * ) Notice: Subject to any disclaimer, the term of this patent is extended or adjusted under 35 U.S.C. 154(b) by 941 days.

(21) Appl. No.: 13/147,699

(22) PCT Filed: Feb. 4, 2010

(86) PCT No.: PCT/NL2010/050049
§ 371 (c)(1),
(2), (4) Date: Jan. 17, 2012

(87) PCT Pub. No.: WO2010/090520
PCT Pub. Date: Aug. 12, 2010

(65) Prior Publication Data
US 2012/0103896 A1    May 3, 2012

(30) Foreign Application Priority Data

Feb. 4, 2009 (NL) .................................... 2002494

(51) Int. Cl.
*B01D 17/028* (2006.01)
*B01D 17/02* (2006.01)

(52) U.S. Cl.
CPC ....... *B01D 17/0211* (2013.01); *Y10T 29/49826* (2015.01); *B01D 17/0214* (2013.01)

(58) Field of Classification Search
CPC ........... B01D 17/0211; B01D 17/0214; Y10T 29/49826
USPC .......................... 210/238, 232, 237, 521, 522
See application file for complete search history.

(56) References Cited

U.S. PATENT DOCUMENTS

| | | |
|---|---|---|
| 3,903,000 A | 9/1975 | Miura et al. |
| 4,086,169 A | 4/1978 | Skarheim et al. |
| 4,178,252 A | 12/1979 | Krone |
| 4,273,654 A | 6/1981 | Pielkenrood |
| 4,278,545 A | 7/1981 | Batutis et al. |
| 4,876,063 A | 10/1989 | Johansson |
| 5,904,850 A | 5/1999 | Vellinga |

FOREIGN PATENT DOCUMENTS

| | | |
|---|---|---|
| GB | 1130620 | 10/1968 |
| GB | 1450407 | 9/1976 |
| GB | 2056872 A | 3/1981 |
| GB | 2103505 A | 2/1983 |
| WO | WO 2010090520 A1 * | 8/2010 |

OTHER PUBLICATIONS

The Interntational Preliminary Report on Patentability for PCT/NL2010/050049, Aug. 9, 2011.*

* cited by examiner

*Primary Examiner* — David A Reifsnyder
(74) *Attorney, Agent, or Firm* — The Webb Law Firm

(57) ABSTRACT

The invention relates to a device for separating a flowing liquid mixture into at least two fractions with differing mass density, comprising: a plurality of plates disposed substantially parallel to each other and a frame engaging at least substantially round the plates. The invention also relates to a throughflow tank provided with such a plate separator device and a method for manufacturing a plate separator device.

13 Claims, 5 Drawing Sheets

DEVICE FOR SEPARATING A FLOWING MEDIUM COMPRISING MIXTURE INTO FRACTIONS, THROUGHFLOW TANK AND METHOD FOR MANUFACTURING A PLATE SEPARATOR DEVICE

BACKGROUND OF THE INVENTION

1) Field of the Invention

The invention relates to devices for separating a flowing medium comprising mixture into at least two fractions with differing mass density, and more particularly to plate separator devices a throughflow tank provided with such a plate separator device and a method for manufacturing a plate separator device.

2) Description of the Prior Art

The separation of fractions by means of sedimentation requires time and makes it necessary when processing larger volumes of medium mixture to make use of voluminous reservoirs, this being costly. Particularly, though not exclusively, in the separation of water and oil in the oil extraction and oil processing industry use is made here of throughflow tanks. These are so-called gravitational separators which make use of the difference in density between the fractions for separating (for instance oil particles dispersed in water). The separating efficiency of a gravitational separator is determined to a significant extent by the separating surface (F) and the throughput (Q). Particles with a rise speed greater than or equal to the surface load (Q/F) can be wholly separated. A gravitational separator is intended for the purpose of forming floating layers. The floating layer thus formed in the separator can subsequently be removed, for instance using a so-called skimmer or an overflow. In order to now increase the efficiency of a throughflow tank there already exist throughflow tanks in which use is made of one or more plate packs between which the fractions for separating flow. The advantage of applying a plate pack is that a more efficient separation is hereby obtained, by increasing the separating surface, than when a plate pack is absent. The result of the presence of a plate pack compared to the absence thereof is that the liquid need remain for a shorter period in the throughflow tank in order to nevertheless achieve a desired separating result. An additional advantage is accordingly that the throughflow tank can also be given a relatively compact form. However also other separations than fluid/fluid separation, like fluid/gas-separation or fluid/solid-separation, can be supported by the presence of a plate pack in the mixture flow to be separated.

The U.S. Pat. No. 5,904,850 discloses a settling device for a fluid containing liquid. The fluid is fed to a settling chamber wherein one or more caps are disposed with their longitudinal axis at an angle to the fluid level. The caps are positioned relative to each other by means of an essentially horizontally extending, V-shaped collecting cap. This V-shaped collecting cap extends through ridges of a row of successive mutually partially overlapping caps. Just below the V-shaped collecting cap passages are formed for the conduction of in particular gaseous fluid.

The drawback of the plate packs accelerating the separation of a medium comprising mixture is that the plate packs are relatively costly, bulky and the useful throughflow surface thereof is limited. The prior art plate packs are also labour-intensive to assemble.

The present invention has for its object to provide a device for separating a flowing medium comprising mixture which, while retaining the advantages of the prior art, is cheaper to manufacture and operate. The invention also has for its object to provide a throughflow tank provided with a plate separator device and to provide a method for manufacturing such a plate separator device.

SUMMARY OF THE INVENTION

The invention provides for this purpose a device for separating a flowing medium comprising mixture, characterized in that an elongate coupling member: A) is insertable through openings in a specific insert rotation position, and B) turned around its axis relative to the insert rotation position to a distance keeping rotational position that determines the distance between the plates in fixed manner. The plates are preferably—but not exclusively—flat plates. The particular measures of the device according to the present invention considerably facilitate manufacture of a plate separator device (also referred to as a plate pack). This will of course have an immediately advantageous effect on the price for which a plate pack can be manufactured. Another advantage of the device according to the invention is that it can be embodied such that the useful throughflow surface thereof is much more advantageous than in the prior art devices. The elongate coupling member provides strength to the construction thus enabling the use of lighter frames which enhances the relative active surface of the separating device (plate pack) compared to the prior art separating devices.

It is additionally noted that the separation of the fractions is understood to mean at least partial separation of two fractions such that a significant difference results in the average mass density of the two fractions; a complete (100%) separation will be difficult or impossible to realize. This is a separation which increases the options for use of at least one of the fractions relative to the mixture. This usable ("cleaned") fraction may still have a part of another undesirable fraction even after separation ("be contaminated with another fraction"), but the presence of this other fraction is significantly smaller than the presence of this undesirable fraction in the original mixture. A still higher separating efficiency can be obtained with an optional subsequent processing of a separated fraction.

Owing to the special shaping of the openings in the plates and the shaping of the elongate coupling member adapted to the form of the openings a plate pack is quick to assemble, it also makes an incorrect setting of the desired mutual distances between the plates impossible. It is therefore a foolproof system for which the skills of the assembler are not relevant, or in any case less so, relative to the traditional method in which plate packs have heretofore been assembled. This advantage can be increased still further if the elongate coupling member is provided with "positioning edges", whereby during rotation of the elongate coupling member in a situation where it has been inserted through the openings of a number of plates the plates are placed in a desired relative position if they were not already situated at the desired mutual distance. Such aligning edges (a section of the elongate coupling member decreasing gradually in axial direction toward the recessed locations in which the plates are held) facilitate assembly and prevent assembly taking place in incorrect manner.

For a good assembly it is further desirable that in a plate separator device the asymmetrical cross-section of the elongate coupling member perpendicularly of the axis of the elongate coupling member has a section at a position located between the plates which varies from a circle-symmetrical section. Owing to this measure the rotation of the elongate coupling member can have the result (provided the form of the openings is adapted for this purpose) that in the rotated position the elongate coupling member can no longer be carried through the openings in the plates; a reliable coupling is thus realized. For good operation it is further desirable that a coupling opening in a plate takes an asymmetrical form. The form of the openings must be adapted to the shaping of the elongate coupling member; in a determined rotation position it must be possible to insert the elongate coupling member through the openings, and in another (rotated) rotation position it must be no longer possible, or hardly so, to displace the elongate coupling member in axial direction through the opening.

In another advantageous embodiment variant of the plate separator device the longitudinal sides of the plates are provided with protrusions with which they can be placed in openings arranged for this purpose in the frame. The plates can thus be inserted in a simple manner into frame parts; this measure also simplifies assembly and reduces the chance of incorrect assembly. It is noted that it is also advantageous to embody the frame using profile parts, these profile parts defining the ribs of a substantially block-like structure. An additional advantage of such a frame is that the useful front surface of the plate separator device can be increased by as much as 10-20% compared to the traditional plate separator device. Because the mutual fixation of the plate is provided by the elongate coupling members and the fixing of the plates to the frame can be realized in simple manner with the protrusion/recess construction as described, the profile parts on the end surfaces of the plate separator device can be given a relatively thin form such that they impede the throughflow in only very small measure.

In another preferred variant of the plate separator device the plates enclose an angle of 30-60° with the longitudinal sides of the substantially block-like structure defined by the ribs of the frame. In such an inclining position it will be possible to discharge a floating (uppermost) fraction laterally and upward, this simplifying collection of the separated fractions. For feed of the medium for separating, a feed for the fluid comprising mixture for separating desirably connects to a first end surface of the frame, while for the discharge of the separated fractions discharge means connect to a second end surface for the purpose of separate discharge of at least two separated fractions.

In a specific embodiment the plate separator device is suited for the separation of the different liquid fractions by providing means which simplify the separation of the different liquid fractions. It is possible here to envisage means influencing the temperature of the liquid mixture for separating. Electrostatic or other (chemical) influencing of the liquid mixture can however also be advantageous in specific situations.

The present invention also provides a throughflow tank, also referred to as a (separating) pressure vessel, provided with a feed for the fluid containing mixture for separating and provided with at least two separate discharges for the discharge of two separated fractions, wherein the throughflow tank also comprises at least one plate separator device according to any of the foregoing claims. A plurality of plate separator devices are in practice usually placed in a single throughflow tank.

The present invention moreover provides a method for manufacturing a plate separator device for the purpose of separating a flowing fluid containing mixture into at least two fractions with differing mass density according to any of the foregoing claims, comprising the processing steps of: A) placing a plurality of plates in a substantially mutually parallel orientation; B) inserting at least one elongate coupling member through the openings arranged for this purpose in the plates; C) rotating the elongate coupling member inserted through the openings in the plates such that the plates are held by the elongate coupling member at a fixed mutual distance. During processing step A) at least some of the plates can herein be at least partially placed in the frame, for instance in that the plates are placed with protrusions on the longitudinal sides of the plates into recesses arranged for this purpose in the frame. This method provides the advantages already described above in respect of the plate separator device according to the present invention. Assembly is extremely simple, and therefore requires little skill, can take place at random locations and ensures that the assembly takes place in error-free and accurate manner. In order to prevent the plate separator device becoming detached, it is desirable that, after rotation of the elongate coupling member as according to processing step C), the coupling member is secured, for instance by welding, such that it is no longer rotatable at all.

BRIEF DESCRIPTION OF THE DRAWINGS

The present invention will be further elucidated on the basis of the non-limitative exemplary embodiments shown in the following figures. Herein.

DETAILED DESCRIPTION OF THE PREFERRED EMBODIMENTS

Figure 1:
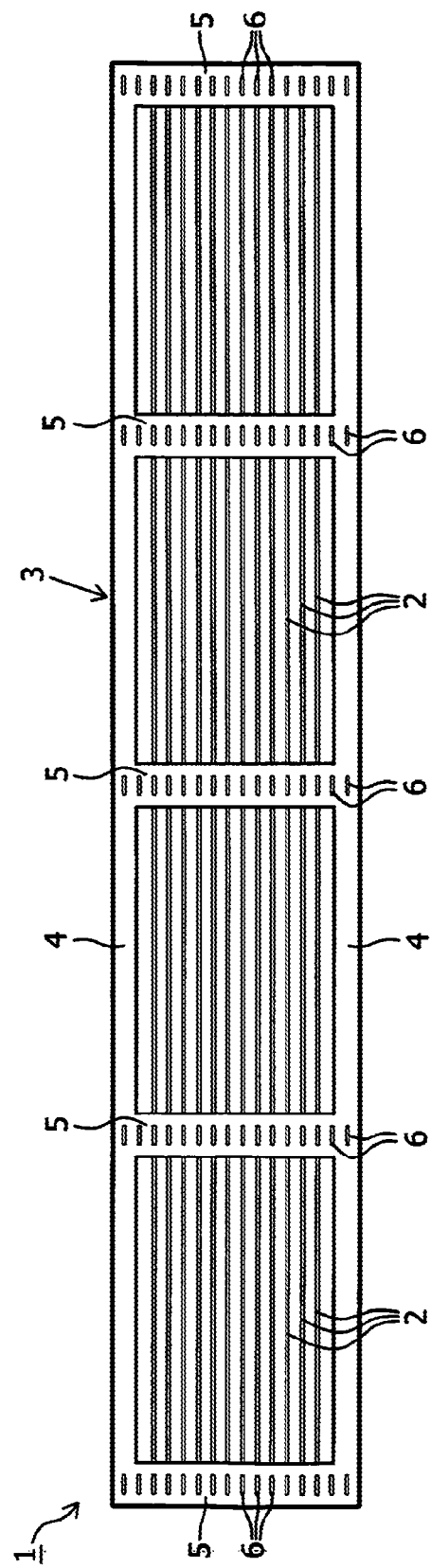
FIG. 1 is a side view of a plate separator device according to the present invention.

FIG. 1 is a side view of a plate separator device 1. A package of plates 2 in parallel arrangement are here enclosed by a frame 3. Shown in this figure are longitudinal profiles 4 of this frame 3 which are mutually connected by transverse connections 5. Arranged in transverse connections 5 are recesses 6 which co-act with tongues, which are not readily visible in this figure (see for this purpose FIGS. 3-5) and which form part of plates 2. The length of plate separator device 1 is typically 0.5-2 m.

Figure 2:
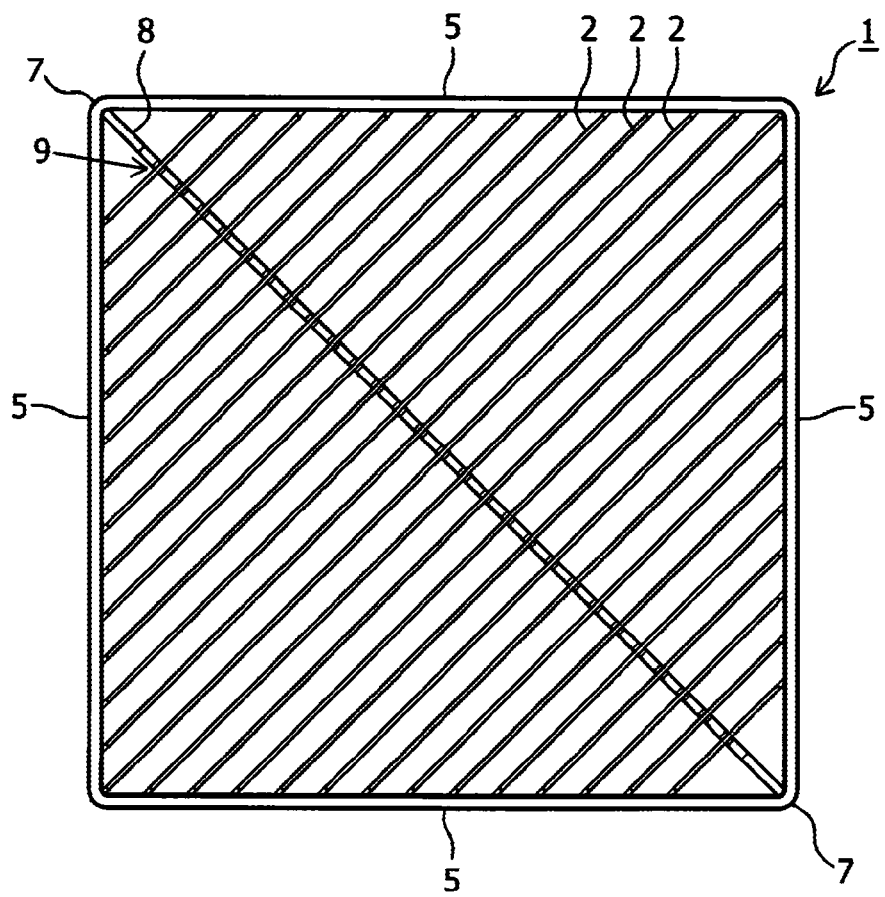
FIG. 2 is a front view of a plate separator device as shown in FIG. 1.

FIG. 2 shows a front view of plate separator device 1 of FIG. 1. Visible once again here are transverse connections 5 which, as shown, are rigidly connected to each other at corner points 7. Also highly relevant is an elongate coupling member 8 as shown in this figure. This elongate coupling member 8 is inserted through openings 9 recessed for this purpose into plates 2 and subsequently rotated such that the shown mutual distance between plates 2, typically 5-20 mm, is fixed by elongate coupling member 8.

Figure 3:
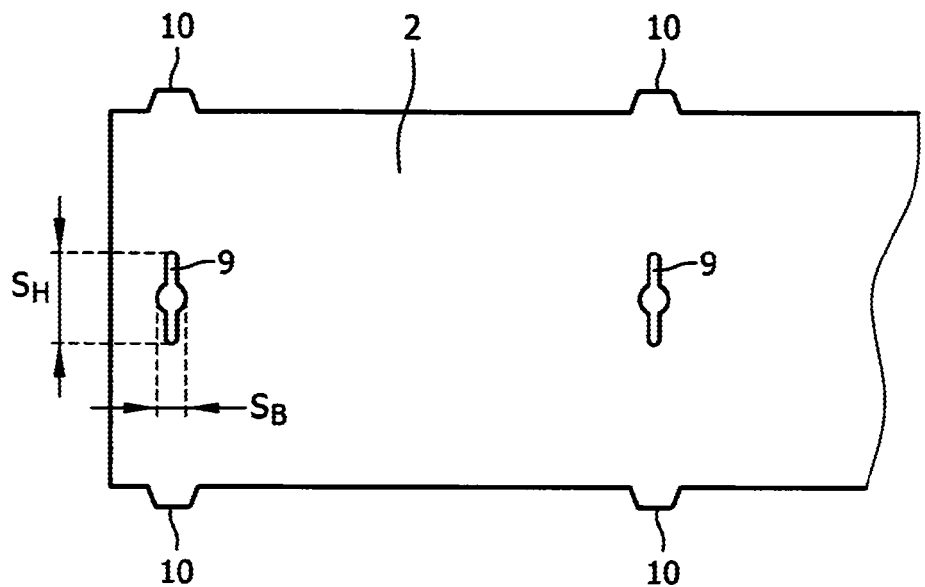
FIG. 3 is a top view of a part of an individual plate as component of the plate separator device shown in the foregoing figures.
Figure 4:
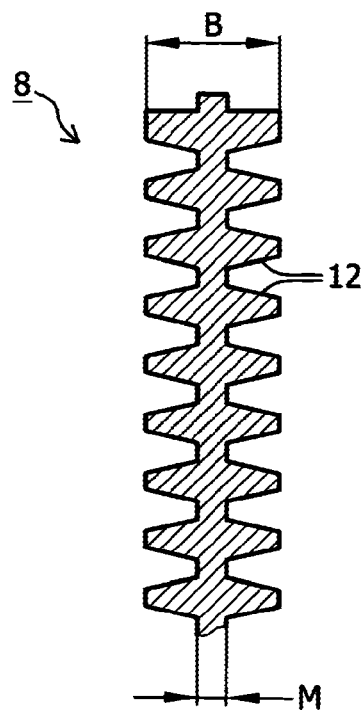
FIG. 4 is a top view of an elongate coupling member as component of the plate separator device shown in FIGS. 1 and 2.

FIG. 3 is a top view of a part of an individual plate 2, wherein clearly visible on the longitudinal sides are the protruding tongues 10 which co-act with recesses 6 in the transverse connections as shown in FIG. 1. Openings 9 are also shown in more detail than in FIG. 2. Slot-like openings 9 are adapted for passage of an elongate coupling member 8. This elongate coupling member 8 is shown partially in top view in FIG. 4, and is in this case manufactured (cut) from a plate material; it is therefore a flat element. The maximum width (B) of elongate coupling member 8 is smaller than the maximum height (SH) of slot-like openings 9 (see FIG. 3). The toothed elongate coupling member 8 can thus be inserted through slot-like openings 9 and subsequently rotated through 90°. The minimum distance (M) between the teeth of elongate coupling member 8 is fractionally smaller than (or equal to) the width (SB) of slot-like openings 9 at the position where the elongate coupling member 8 engages. Elongate coupling member 8 thus forces plates 2 to a desired mutual distance. Small inaccuracies in the relative positioning of plates 2 will be corrected by the inclining tooth sides 12 during the rotation of elongate coupling member 8. It is noted that slot-like openings 9 can also be arranged in plate 2 in a rotated orientation. It is also possible to vary the shaping in respect of the toothed elongate coupling member 8; it is thus possible for instance to envisage giving the toothing a smooth form.

Figure 5:
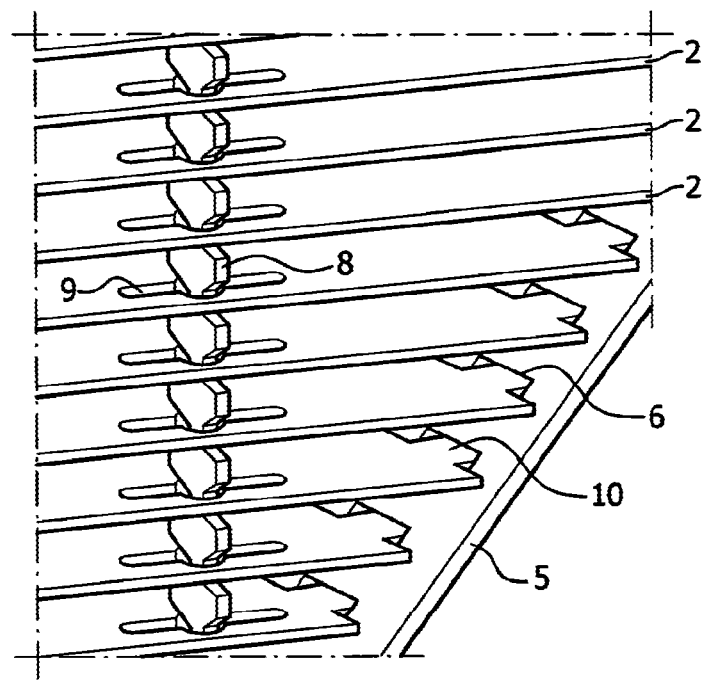
FIG. 5 is a detail view of a part of the front side of the plate separator device as shown in FIGS. 1 and 2.

FIG. 5 is a detail view of a part of the front side of plate separator device 1. Clearly shown here is that the toothed elongate coupling member 8 is inserted through slot-like openings 9 and then rotated through a quarter-turn. Also clearly shown is that protruding tongues 10 of plates 2 are placed in recesses 6 arranged for this purpose in transverse connections 5.

Figure 6:
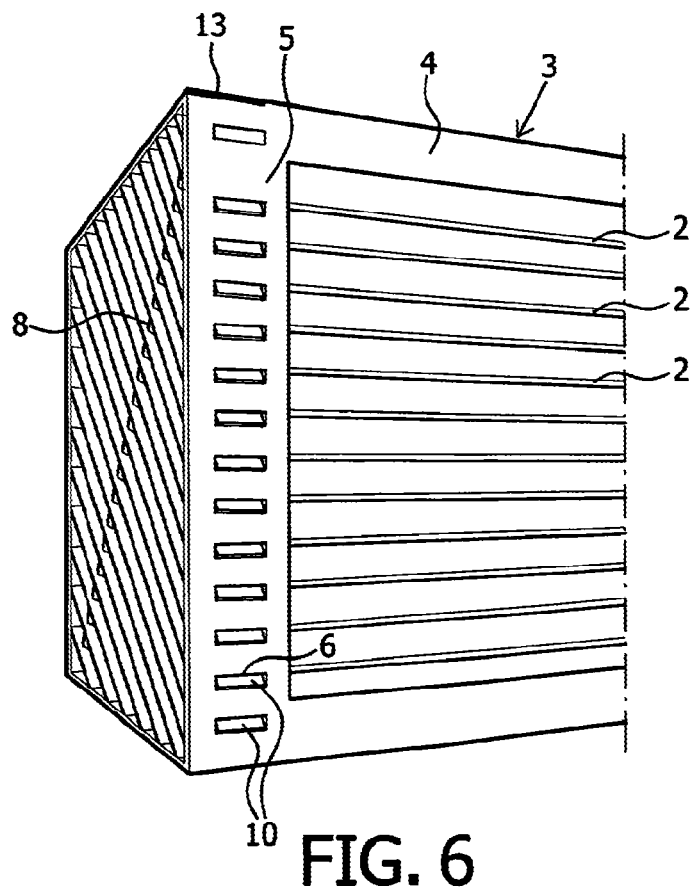
FIG. 6 is a perspective view of a part of the plate separator device as shown in FIGS. 1 and 2, and FIG. 7 a perspective view on an alternative embodiment of a plate separator device according to the present invention.

Finally, FIG. 6 is a perspective view of a part of plate separator device 1 as already shown above. Additionally shown clearly in this figure is that the toothed elongate coupling member 8 is fixed relative to frame 3 by means of a welded connection 13. A typical flow speed of the mixture is 0.03-0.15 meter/second, more particularly 0.07 m/s. Because the plate separator device only functions properly in the case of a laminar flow of the liquid mixture, the Reynolds number is typically lower than 2300.

Figure 7:
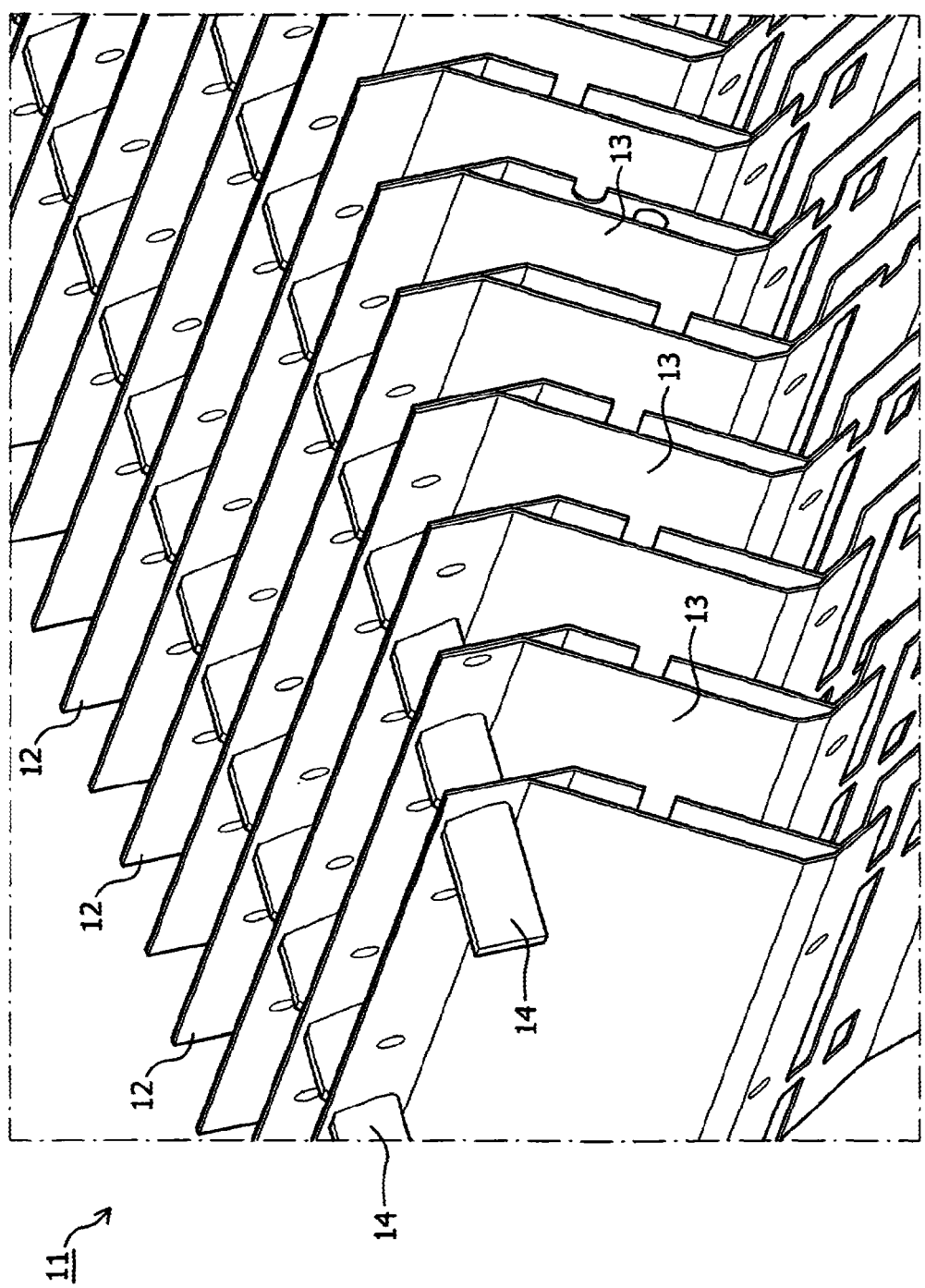

FIG. 7 shows a perspective view on an alternative embodiment of a plate separator device 11 according to the present invention. Here the plates 12 are not flat but curved as they e.g. are formed in vane packs used in a coalescer. Such a plate separator device 11 is also known as a "demister" and makes use of the plates 12 (vanes) normally placed in a vertical or horizontal tube (vessel) where through in upward direction a gas/liquid mixture is fed. During passage of the winding apertures 13 between the plates 11 liquid particles (droplets) in the gas/liquid mixture will collide with the plates 11 resulting in collection of a liquid film on the plates 11. Due to gravity the liquid caught in the film will flow downwards. The vanes 12 in the demister 11 are coupled by longitudinal profiles 14 which are after being inserted rotated axially to their distance keeping rotational position as depicted.

The invention claimed is:

1. A device for separating a flowing medium comprising a mixture into at least two fractions with differing mass density, comprising:
   a plurality of plates disposed substantially parallel to each other, and
   a frame engaging at least substantially round the plurality of plates,
   wherein the plurality of plates disposed substantially parallel to each other are provided with coupling openings, through which coupling openings is inserted at least one elongate coupling member which, in a direction perpendicularly of a longitudinal axis of the elongate coupling member, has an asymmetrical cross-section at positions located between the plurality of plates,
   wherein the elongate coupling member:
   A) is insertable through the coupling openings in an insert rotation position, and
   B) turned around the longitudinal axis relative to the insert rotation position to a distance keeping rotational position that determines the distance between the plurality of plates in fixed manner.

2. The device as claimed in claim 1, wherein the elongate coupling member perpendicularly of the longitudinal axis of the elongate coupling member has a section at a position located between the plurality of plates that is non-circular.

3. The device as claimed in claim 1, wherein longitudinal sides of the plurality of plates are provided with protrusions that are placed in openings in the frame.

4. The device as claimed in claim 1, wherein the frame comprises longitudinal sides connected by transverse connections to form a substantially block-shaped structure.

5. The device as claimed in claim 4, wherein the plurality of plates are positioned at an angle of 30-60° to the longitudinal sides of the substantially block-like structure of the frame.

6. The device as claimed in claim 1, wherein a feed for providing the flowing medium is connected to a first end surface of the frame.

7. The device as claimed in claim 1, wherein a discharge for discharging the at least two fractions from the device is connected to a second end surface of the frame.

8. The device as claimed in claim 1, wherein the device further comprises at least one of a temperature component and an electrostatic component to influence the separation of the flowing medium.

9. A throughflow tank provided with a feed for providing a liquid mixture to be separated and at least two separate discharges for discharging two separated liquid fractions, wherein the throughflow tank also comprises at least one device as claimed in claim 1 located between the feed and the at least two separate discharges.

10. A method for manufacturing a plate separator device for the purpose of separating a flowing liquid mixture into at least two fractions with differing mass density, comprising the processing steps of:
   A) placing a plurality of plates provided with coupling openings in a substantially mutually parallel orientation;
   B) inserting at least one elongate coupling member through the coupling openings in the plurality of plates; and
   C) rotating the elongate coupling member inserted through the coupling openings in the plurality of plates such that the plurality of plates are held by the elongate coupling member at a fixed mutual distance.

11. The method as claimed in claim 10, wherein during processing step A) at least some of the plurality of plates are at least partially placed in a frame.

12. The method as claimed in claim 11, wherein protrusions on longitudinal sides of the plurality of plates are placed into recesses arranged in the frame.

13. The method as claimed in claim 10, wherein after rotation of the elongate coupling member in processing step C), the coupling member is secured such that it can no longer be rotated.

* * * * *